(12) United States Patent
Breault et al.

(10) Patent No.: US 8,318,362 B2
(45) Date of Patent: Nov. 27, 2012

(54) FUEL CELL WITH ELECTROLYTE CONDENSATION ZONE

(75) Inventors: Richard D. Breault, North Kingstown, RI (US); Robert R. Fredley, Tolland, CT (US)

(73) Assignee: UTC Power Corporation, South Windsor, CT (US)

( * ) Notice: Subject to any disclaimer, the term of this patent is extended or adjusted under 35 U.S.C. 154(b) by 893 days.

(21) Appl. No.: 11/803,772

(22) Filed: May 16, 2007

(65) Prior Publication Data

US 2007/0224476 A1 Sep. 27, 2007

Related U.S. Application Data

(63) Continuation of application No. PCT/US2004/043284, filed on Dec. 22, 2004.

(51) Int. Cl.
*H01M 8/00* (2006.01)
(52) U.S. Cl. ......... 429/400; 439/482; 439/508; 439/523
(58) Field of Classification Search .................. 429/400, 429/482, 508, 523
See application file for complete search history.

(56) References Cited

U.S. PATENT DOCUMENTS

| | | | | |
|---|---|---|---|---|
| 4,345,008 | A | * | 8/1982 | Breault .......................... 429/434 |
| 4,414,291 | A | | 11/1983 | Breault |
| 4,652,502 | A | * | 3/1987 | Breault et al. ................. 429/446 |
| 4,755,439 | A | | 7/1988 | Trocciola et al. |
| 4,786,568 | A | | 11/1988 | Elmore et al. |
| 4,978,591 | A | | 12/1990 | Wright |
| 5,173,373 | A | | 12/1992 | Ohsuga |
| 5,270,132 | A | | 12/1993 | Breault et al. |
| 6,352,742 | B1 | | 3/2002 | Murata et al. |

FOREIGN PATENT DOCUMENTS

JP 360189869 A 9/1985

* cited by examiner

*Primary Examiner* — Jane Rhee
(74) *Attorney, Agent, or Firm* — M. P. Williams

(57) ABSTRACT

A fuel cell 12 has a liquid electrolyte 20, a cathode electrode 28, and an anode electrode 26. The fuel cell includes an electrolyte condensation zone 58 extending from an edge 56 of a first catalyst layer 36 on the cathode electrode to an outer edge 48 of an edge seals 52 and 49. An anode electrode has an anode catalyst layer 30 with an end substantially coinciding with an inner edge 53 of the edge seals. The acid condensation zone is located near the reactant exit, so that electrolyte that has evaporated into the reactant stream can condense out before leaving the fuel cell for re-absorption back into the fuel cell.

11 Claims, 3 Drawing Sheets

FUEL CELL WITH ELECTROLYTE CONDENSATION ZONE

This is a continuation application under 35 U.S.C. 120 and 363 of PCT Application No. PCT/US2004/043284, filed Dec. 22, 2004.

TECHNICAL FIELD

This invention relates to fuel cells, and more particularly to fuel cells having a liquid electrolyte and an electrolyte condensation zone.

BACKGROUND ART

In fuel cells that use a liquid electrolyte, there is some evaporation of the electrolyte into the reactant gas streams as they pass through the cell, particularly into the air (oxidant) stream, which can flow at a higher rate than the hydrogen (fuel) stream. Although the evaporation is slight, it may become significant over a long period of time and may eventually cause the cell to fail due to an electrolyte shortage within the cell. Thus, for extended periods of operation it may be necessary to recover the lost electrolyte and return it to the cell. Electrolyte condensation zones of the type described in U.S. Pat. No. 4,345,008, issued on Aug. 17, 1982 to Breault, can be used to recover electrolyte that has evaporated into a reactant stream. The U.S. Pat. No. 4,345,008 describes a phosphoric acid fuel cell, and the electrolyte condensation zone is thus referred to as an acid condensation zone. The acid condensation zone is a non-reactive portion of an electrode near a reactant outlet. The non-reactive area does not support the fuel cell electrochemical reaction, and is thus cooler than the catalyzed, electrochemically active portions of the electrode. The condensation zone is cool enough for evaporated electrolyte to condense out of the reactant stream so that it can be recovered before exiting the fuel cell. It has been discovered that fuel cells having electrolyte condensation zones may be subject to corrosion and degradation in the areas of edge seals.

DISCLOSURE OF THE INVENTION

A fuel cell has a cathode electrode, an anode electrode, and an electrolyte. The cathode electrode has a cathode catalyst layer and an electrolyte condensation zone. The condensation zone is adjacent a reactant outlet and comprises an un-catalyzed, non-reactive area extending from an end of the cathode catalyst layer to an outer edge of the fuel cell. The anode electrode has an anode catalyst layer that extends across the non-reactive area and has an end that is substantially coincident with an inner edge of an edge seal. The liquid electrolyte can be phosphoric acid, and it can also be a free acid contained a fuel cell having a high temperature membrane.

A method for operating a fuel cell stack assembly having at least one fuel cell containing an electrolyte is disclosed. An oxidant is flowed though a cathode flow field plate adjacent to a cathode electrode. The cathode electrode has an electrolyte condensation zone adjacent a reactant outlet that comprises a non-reactive area extending from an end of a cathode catalyst layer to an outer edge of the fuel cell. A fuel is flowed adjacent to an anode electrode. The anode electrode has an anode catalyst layer extending across the non-reactive area with an end substantially coincident with an inner edge of an edge seal. A coolant is flowed through at least one coolant channel in the fuel cell stack assembly. The coolant can enter the stack adjacent the condensation zone, and a greater number of coolant tubes can be adjacent the condensation zone than adjacent the reactive portions of the fuel cell.

A fuel cell comprises an electrolyte, a cathode electrode and an anode electrode. The cathode electrode has an electrolyte condensation zone comprised of a non-reactive are adjacent a reactant outlet, extending from an end of a cathode catalyst layer to an outer edge of the fuel cell. The fuel cell's edge seal may be a wet seal that contains materials that inhibit the reduction of oxygen at an outer surface of the edge seal. Materials used in a wet seal can include tungsten oxide, silicon carbide, and mixtures thereof. The edge seal can also be a solid seal. Materials used in a solid seal can include polymers and graphite polymeric composites.

BEST MODE FOR CARRYING OUT THE INVENTION

Figure 1:
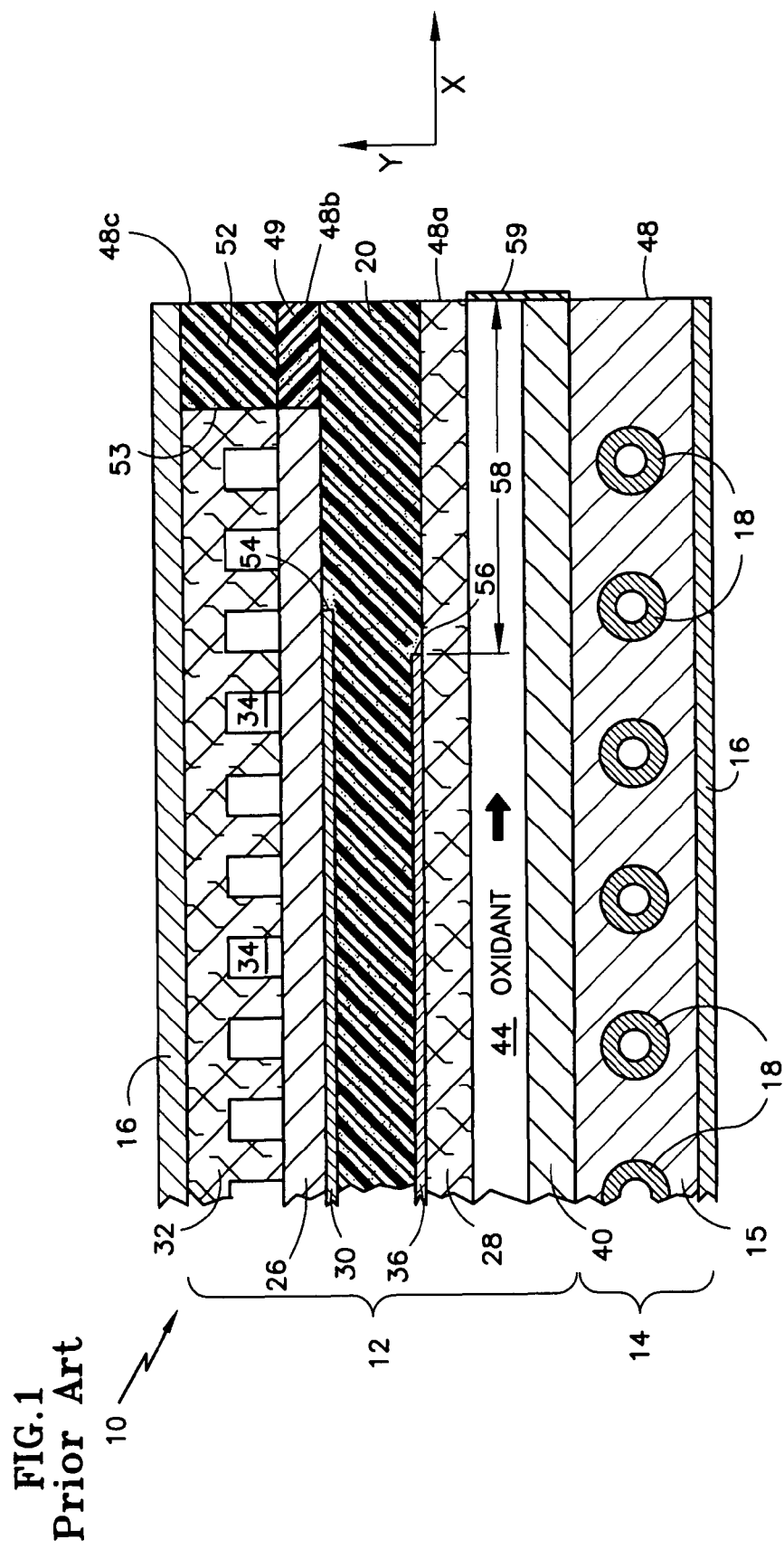
FIG. 1 is a cross section of a portion of a phosphoric acid fuel cell stack having an acid condensation zone known in the prior art.

FIG. 1 is a cross-sectional view of part of a fuel cell stack 10 made up of fuel cells 12, coolant holder assemblies 14, and gas impervious separator plates 16. The stack components have constructions known to those skilled in the art and are arranged relative to each other in a manner known to those skilled in the art. A holder layer 15 of the coolant holder assembly can hold a plurality of coolant passages such as tubes or channels 18 that carry coolant through the stack to withdraw the heat generated by the electrochemical reaction within the fuel cell stack. Each cell 12 includes an electrolyte retaining matrix layer 20 having an anode or fuel electrode 26 disposed on one side and a cathode or oxidant electrode 28 disposed on the other side. The electrolyte can be phosphoric acid and the matrix layer 20 can be silicon carbide with a binder such as polytetrafluoroethylene.

The anode and cathode electrodes can each be of a gas diffusion type, wherein each electrode comprises a fibrous, gas porous carbon substrate, which may be made in any manner known to those skilled in the art. The anode substrate 26 has a catalyst layer 30 facing the electrolyte matrix 20. An anode flow field plate 32 has a plurality of parallel fuel channels 34, can interconnect a fuel inlet manifold (not shown) on one side of the stack with a fuel outlet manifold (not shown) on the other side. The fuel flow field can be a single pass or a multi pass flow field.

The cathode electrodes 28 are similar in construction to the anode electrodes 26. The cathode electrode 28 has a thin layer of catalyst 36 is on the flat surface of the substrate facing the electrolyte matrix 20 The catalyzed areas of the anode and cathode support the fuel cell electrochemical reaction and are oftentimes referred to as the electrochemically active area. The cathode flow field plate 40 has oxidant channels 44 for carrying the oxidant across the cells in a direction perpendicular to the fuel flow. Both catalyst layers 30 and 36 stop short of the outer edge of the fuel cell 48.

An edge seal 49 is impregnated into the anode electrode 26. An edge seal 52 is also included in the anode flow field plate 32. The edge seals can be substantially the same width and have inner edge 53. The edge seals are typically 1.8 cm to 3.6 cm (0.7 in-1.4 in) wide. The anode flow field plate can be a porous electrolyte reservoir that is known to those skilled in the art. The same or similar seals can exist elsewhere in the fuel cell, with their locations being known to those skilled in the art, and are therefore omitted for clarity. An example of an edge seal that can be used in this embodiment is a wet seal as described in U.S. Pat. No. 4,652,502, issued to Breault on Mar. 24, 1987, which is hereby incorporated by reference in its entirety. In the U.S. Pat. No. 4,652,502 patent, the edge seal is formed by impregnating particles such as carbon and silicon dioxide into the porous structure at the fuel cell edge, so as to reduce the pore sizes and increase capillary forces in the edge seal area. Thus, when phosphoric acid fills the pores in the edge seal there is sufficient capillary force to retain the acid in the seal and form the wet seal.

The anode catalyst layer 30 and cathode catalyst layer 36 terminate at catalyst ends 54 and 56, respectively. The length along the x-axis between the cathode catalyst end 56 and the wet seal inner edge 53 can be about 5.1 cm to 12.7 cm (2 to 5 inches). The fuel cell's electrochemical reaction does not take place across this length, nor does it take place in the area of the wet seal, due to the absence of catalyst, and thus it is cooler than the electrochemically active portions of the cell. This cooler section is a condensation zone 58 that extends from an end 56 to the outer edge of the fuel cell, and it is placed at the oxidant outlet 59 so that electrolyte that has evaporated into the reactant stream can condense out for absorption back into the fuel cell.

It has been discovered that the combination of wet seals with acid condensation zones can promote carbon corrosion at or near the outer edge 48a of the cathode substrate. It is believed that the cause of the carbon corrosion is an increased difference in potential between the electronic conducting phase and the electrolyte. The difference in potential is caused by the reduction of oxygen at the outer edges 48b and 48c that creates a demand for protons generated at anode catalyst end 54. The in-plane flow of protons from the catalyst end to the outer edges of the wet seals increases the difference in potential between the electronic conducting phase and the electrolyte and results in more rapid corrosion at the outer edge 48a of the cathode substrate.

Oxygen can be reduced at the outer edge of the anode electrode when materials capable of reducing oxygen are found in the presence of oxygen, the phosphoric acid electrolyte, and a low potential. This situation exists at outer edges 48b and 48c on the anode electrode and flow field because the edge is exposed to oxygen (i.e. air), the wet seal particulate filler is carbon, which is capable of reducing oxygen, and phosphoric acid fills the pores in the wet seal.

As an alternative to using carbon to form the wet seals, materials that do not reduce oxygen can be used. Examples of such materials include, for example, tungsten oxide, silicon carbide, and mixtures thereof. Use of these materials will inhibit or eliminate the reduction of oxygen relative to an embodiment with carbon in the wet seal, which will result in a lower amount of carbon corrosion. In an alternative embodiment, the wet seal can be replaced with a solid edge seal, made with a material such as, for example, a polymer or a graphite polymeric composite. The use of a solid edge seal will also decrease or eliminate the reduction of oxygen, since it prevents the phosphoric acid from entering the edge seal area, and thus serves to reduce corrosion relative to using a wet seal.

Figure 3:
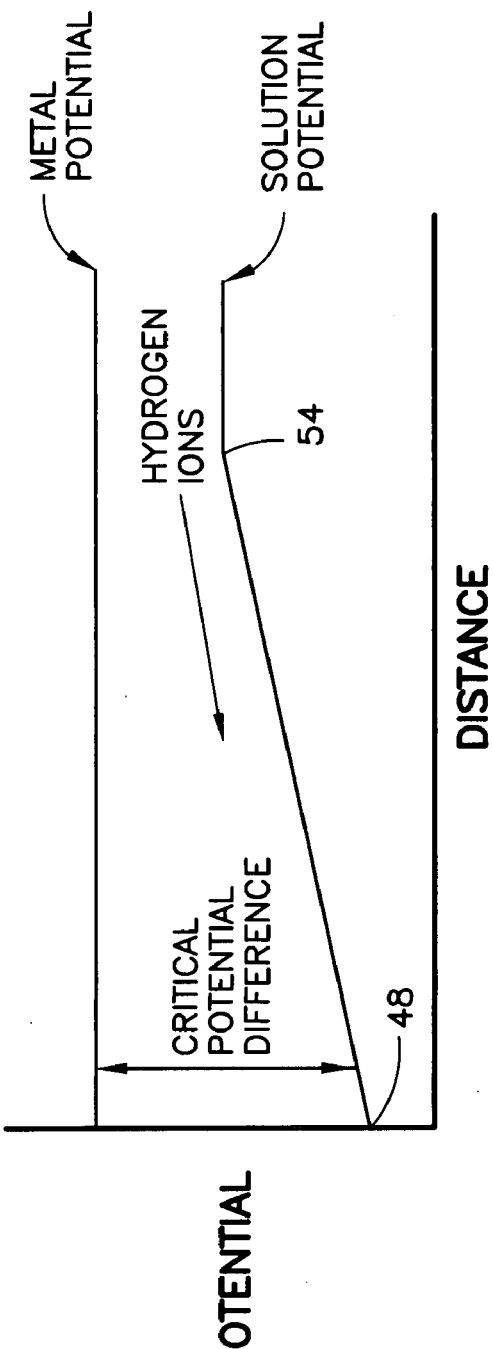
FIG. 3 is a chart illustrating the relationship between distance and potential in the embodiment of FIG. 1.

For a given reaction rate at the outer edges 48b and 48c of the seal, the difference in potential is governed by Ohm's law, where the difference in solution potential between edges 48b and 48c, and the catalyst end 54, is dependent on the oxygen reduction current at these edges, and the distance between these edges and the catalyst end 54. The relationship between distance and potential for the embodiment of FIG. 1 is shown graphically in FIG. 3. FIG. 3 illustrates how the difference in potential increases with increased distance from the catalyst end 54, reaching its maximum at the wet set seal outer edges 48b and 48c, for an embodiment in which the ends of both catalyst layers are 5.1 cm to 12.7 cm (2 inches to 5 inches) from seal inner edge 53. Note that in FIG. 3, the condensation zone 58 is on the left side of the graph, whereas it is shown on the right side of the embodiment in FIG. 1.

Figure 2:
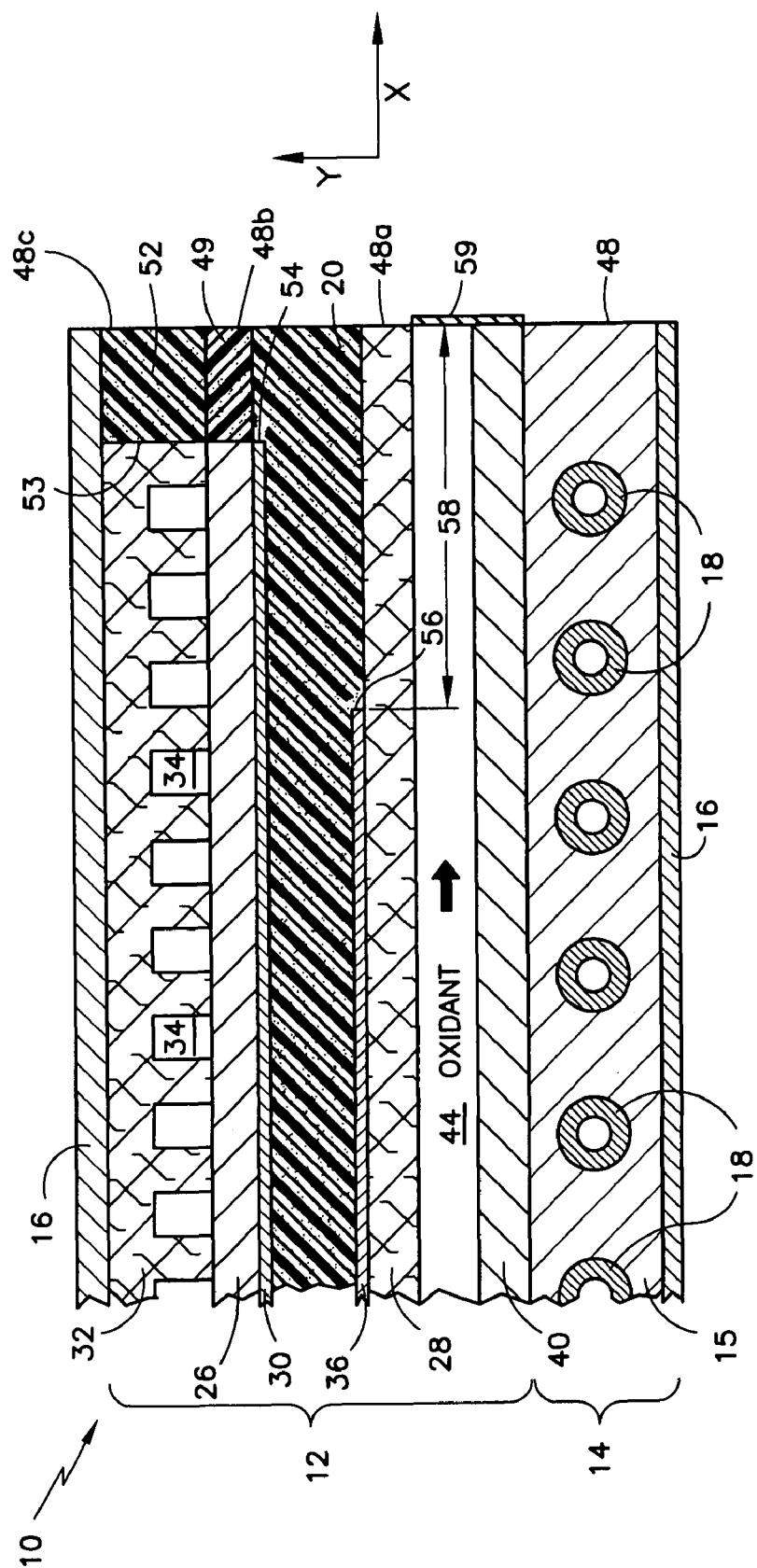
FIG. 2 is a cross section of a portion of a phosphoric acid fuel cell stack having an improved acid condensation zone.
Figure 4:
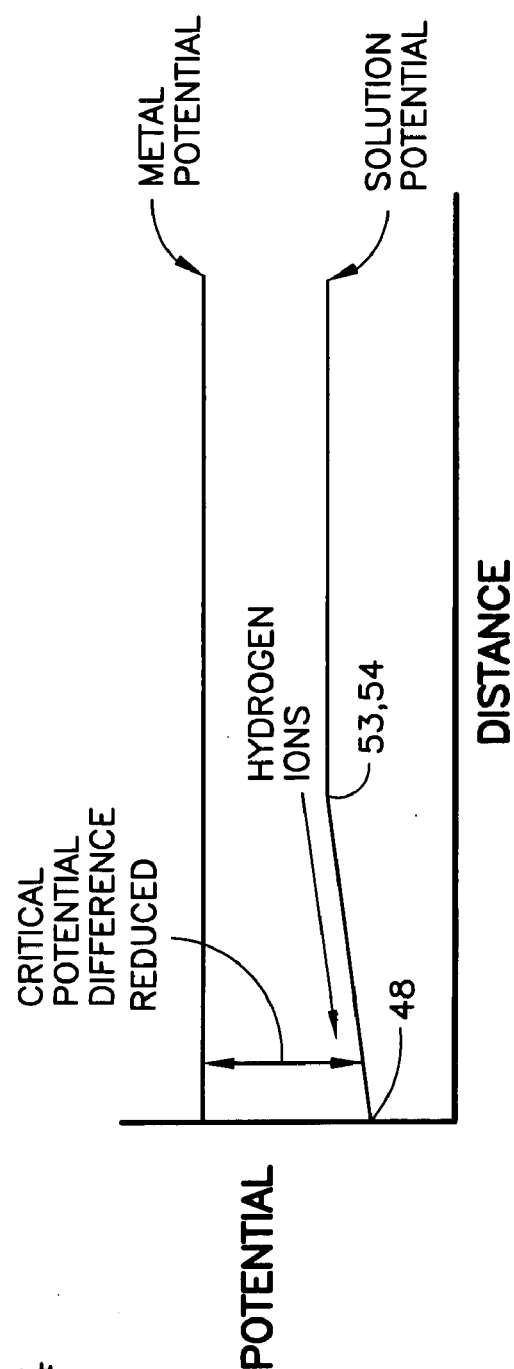
FIG. 4 is a chart illustrating the relationship between distance and potential in the embodiment of FIG. 2.

FIG. 2 shows an embodiment similar to FIG. 1 with a different configuration of anode catalyst 30. In this embodiment the anode catalyst 30 stretches in the x-direction across the length of the non-reactive condensation zone 58 on the cathode electrode and has an end 54 that is substantially coincident with wet seal inner edge 53. The term substantially coincident includes structures where the catalyst end 54 extends as much as about halfway across the edge seal. The length of the electrochemically inactive acid condensation zone 58, measured along the x-axis from the cathode catalyst end 56 to the outer edge 48 of the fuel cell, is the same as that in the embodiment of FIG. 1. However, relative to FIG. 1, the distance between the outer edge 48 and the anode catalyst end 54 is greatly reduced. This reduces the ionic resistance relative to the embodiment shown in FIG. 1. As shown in FIG. 2, the distance can be reduced to substantially the width of the edge seals 49 and 52. The relationship between distance and potential for this embodiment is shown in FIG. 4. Note that in FIG. 4, the acid condensation zone 58 is on the left side of the graph, whereas it is shown on the right side of the embodiment in FIG. 2.

FIG. 3 shows the metal and solution potential as a function of position for the prior art cell configuration shown in FIG. 1. The end of the anode catalyst 54 in FIG. 1 is typically about 10 cm (3.9 in) from the edge of the cell. FIG. 4 shows the metal and solution potential as a function of position for the embodiment shown in FIG. 2. The end of the anode catalyst 54 in the FIG. 2 embodiment is typically about 1.8 cm (0.7 in) from the edge of the cell. The resultant slope of solution potential versus position is about 0.18 times lower for the embodiment in FIG. 2 than for the prior art. This reduction in the potential difference between the metal and solution results in a substantially lower corrosion rate on the cathode at locations 48a and 59 for the embodiment of FIG. 2 when compared with the embodiment of FIG. 1.

There is an emerging technology of high temperature polymer electrolyte membranes. US 2004/0028976A1 describes a modified polybenzimidazole (PBI) membrane and US2004/0125788A1 describes a polymer membrane based on polyazoles. Additional phosphoric acid or polyphosphoric acid, free acids, may be added to fuel cells that incorporate these high temperature polymer electrolyte membranes to enhance their electrochemical performance or to enhance their life. This invention may be used to condense such electrolytes as well as phosphoric acid.

During operation of the stack 10 a fuel such as hydrogen gas passes adjacent to the anode electrode 26 through the channels 34 and comes into contact with the catalyst layer 30 and the phosphoric acid within the matrix 20 through the open pores in the material of the anode electrode. Simultaneously, but in a direction perpendicular thereto, air as the oxidant enters the channels 44 from a manifold on one side of the stack 10 and travels adjacent the cathode electrode 28 and into contact with the catalyst layer 36 and the electrolyte within the matrix 20 via the open pores in the cathode electrode 28.

Electricity, heat, and water are produced by the electrochemical reaction in the cells, as is well known in the art.

Although the vapor pressure of phosphoric acid in air, at operating temperatures on the order of about 177-204 degrees C. (350-400.degree. F) is very low, a small quantity of phosphoric acid evaporates into both the flowing air and hydrogen streams as they travel through the cells. As the air stream passes through the oxidant channels 44 adjacent the condensation zone 58 its temperature begins to drop due to the lack of an electrochemical reaction in the condensation zone. If necessary or desirable, the temperature can be further reduced by flowing a greater amount of cooling fluid per square inch near the condensation zone 50 in the coolant passages 18 than is flowing in proximity to the active portions of the cells. This can be accomplished, for example, by having a greater concentration of coolant channels adjacent the condensation zone than the concentration of coolant channels adjacent the electrochemically active area.

Although the invention has been shown and described with respect to preferred embodiments thereof, it should be understood by those skilled in the art that other various changes and omissions in the form and detail thereof may be made therein without departing from the spirit and the scope of the invention

The invention claimed is:

1. A fuel cell comprising:
an electrolyte;
a cathode electrode and an anode electrode;
an electrolyte condensation zone adjacent at least one reactant exit, comprised of a non-reactive area extending from an end of a cathode catalyst layer to an outer edge of the fuel cell; and
an anode catalyst layer that extends across substantially the entire non-reactive area, wherein an end of the anode catalyst layer is substantially coincident with an inner edge of an edge seal.

2. A fuel cell according to claim 1 wherein the electrolyte is phosphoric acid.

3. A fuel cell according to claim 1 wherein the electrolyte is a free acid contained within a fuel cell having a high temperature electrolyte membrane.

4. A method of operating a fuel cell stack assembly, having at least one fuel cell and containing an electrolyte comprising:

flowing an oxidant through a cathode flow field plate adjacent to a cathode electrode, the cathode electrode having an electrolyte condensation zone adjacent at least one reactant exit comprised of a non-reactive area extending from an end of a cathode catalyst layer to an outside edge of the fuel cell;
flowing a fuel adjacent to an anode electrode, wherein the anode electrode has an anode catalyst layer extending across substantially the entire non-reactive area with an end substantially coincident with an inner edge of an edge seal; and
flowing a cooling through at least one coolant channel in the fuel cell stack assembly.

5. A method according to claim 4, wherein the electrolyte is phosphoric acid.

6. A method according to claim 4 wherein the electrolyte is a free acid contained within a fuel cell having a high temperature electrolyte membrane.

7. A method according to claim 4, wherein the coolant enters the fuel cell stack assembly adjacent the electrolyte condensation zone.

8. A method according to claim 4, wherein there is a greater number of coolant passages in the area adjacent the acid condensation zone than adjacent a reactive portion of the fuel cell.

9. A fuel cell comprising:
an electrolyte;
a cathode electrode and an anode electrode;
the cathode electrode having an electrolyte condensation zone comprised of a non-reactive area adjacent at least one reactant exit, extending from an end of a cathode catalyst layer to an outer edge of the fuel cell; and
wet seal material comprising tungsten oxide and mixtures of tungsten oxide with silicon carbide, at an outer surface of the fuel cell.

10. A fuel cell according to claim 9, wherein the electrolyte is phosphoric acid.

11. A fuel cell according to claim 9 wherein the electrolyte is a free acid contained within a fuel cell having a high temperature electrolyte membrane.

* * * * *